United States Patent

Furuya et al.

[11] Patent Number: 6,150,026
[45] Date of Patent: Nov. 21, 2000

[54] POLYPROPYLENE-BASED RESIN EXTERIOR PANEL AND PROCESS FOR PRODUCING THE SAME

[75] Inventors: Tamio Furuya; Mikihiko Kimura; Yasuki Okanemasa; Satoru Iriyama, all of Sayama; Takakiyo Harada, Ichihara; Michio Yoshizaki, Ichihara; Kouichi Honda, Ichihara; Yasuhiro Mochizuki, Chiba, all of Japan

[73] Assignees: Honda Giken Kogyo Kabushiki Kaisha, Tokyo; Chisso Corporation, Osaka, both of Japan

[21] Appl. No.: 09/041,289

[22] Filed: Mar. 12, 1998

[30] Foreign Application Priority Data

Mar. 14, 1997 [JP] Japan ................................. 9-061214

[51] Int. Cl.[7] ........................................ B32B 27/32
[52] U.S. Cl. ................. 428/424.8; 428/516; 428/520; 264/255; 264/267; 264/275
[58] Field of Search ..................... 428/515, 516, 428/424.2, 424.8, 520; 264/255, 259, 267, 275, 250

[56] References Cited

U.S. PATENT DOCUMENTS 5,310,584  5/1994  Jacoby et al. ............................ 428/2
5,759,588  6/1998  Harada ..................................... 425/111

FOREIGN PATENT DOCUMENTS 2 300 378  11/1996  United Kingdom.

OTHER PUBLICATIONS

Database WPI, Section Ch. Week 8114, Derwent Publications Ltd., Class A60, AN 81–241330– XP–002089044 Feb. 1981.

Database WPI, Section Ch. Week 9637, Derwent Publications Ltd., Class A17, AN 96–368212– XP–002089045 Jul. 1996.

*Primary Examiner*—Vivian Chen
*Assistant Examiner*—D. Lawrence Tarazano
*Attorney, Agent, or Firm*—Jones & Askew, LLP

[57] ABSTRACT

To provide a polypropylene-based resin exterior panel which has the same appearance qualities as a coated product though it is not coated and which is excellent in rigidity and impact resistance, a polypropylene-based resin exterior panel comprising a surface layer made from a highly transparent resin composition comprising a propylene-α-olefin random copolymer having a melting point lower than 155° C. and a melt flow rate (MFR) of 0.5 to 30 g/10 min and a clarifying nucleating agent, an intermediate layer made from a colored resin composition comprising a propylene-α-olefin random copolymer having a melting point lower than 155° C. and an MFR of 0.5 to 30 g/10 min and a coloring pigment, and a base layer made from a base composition comprising a propylene-α-olefin block copolymer having a melting point of 155° C. or higher is produced by forming a skin by laminating the surface layer and the intermediate layer, disposing the skin in an injection mold, and injecting and filling the base composition to form the base layer.

8 Claims, 8 Drawing Sheets

POLYPROPYLENE-BASED RESIN EXTERIOR PANEL AND PROCESS FOR PRODUCING THE SAME

BACKGROUND OF THE INVENTION

The present invention relates to a structure suitable for use as an exterior panel of an industrial product such as an automobile and a home electric appliance. More specifically, the present invention relates to a polypropylene-based resin exterior panel which has the same appearance qualities as a coated product though it is not coated and which is excellent in rigidity and impact resistance.

Since the exterior panel of an automobile or a home electric appliance such a washing machine and a refrigerator has been required to have good appearance qualities, a coated steel panel has been generally used as the exterior panel. For the purpose of reducing weight, resin exterior panels have recently been developed. SMC (sheet molding compound) moldings used as the exterior panel of an automobile and polypropylene resin moldings used as a car bumper are coated to fit their appearance qualities to those of coated steel panels.

Particularly, a coated exterior panel for an automobile is coated with a coating containing a reflective flake pigment such as an aluminum flake pigment and a mica flake pigment to provide a metallic or pearly appearance in addition to a regular coloring pigment. By carrying out such metallic coating or pearly coating, there is provided an exterior panel having good appearance qualities such as color tone, color depth and brightness specific to the coating.

However, as these methods require an additional coating step after steel panel pressing or resin molding, it cannot be said that they are economically excellent methods because of a huge amount of initial investment in coating equipment and facilities and a large number of production steps.

To eliminate this coating step, a thermoplastic resin such as PP (polypropylene), ABS (acrylonitrile butadiene styrene copolymer), PC (polycarbonate) or PPO (polyphenylene oxide: Noryl™ resin), into which a coloring pigment has been incorporated, is used and molded or injection molded into a sheet to obtain a molding such as an exterior panel directly. Particularly, PP is the most preferable because PP is inexpensive and has good moldability, and colored PP is used in many industrial products.

However, a non-coated product obtained by a method which uses such a colored resin and includes no coating step cannot obtain good appearance qualities such as color tone, color depth and brightness specific to coating. Particularly, it shows inferior quality difference from a coated product, especially in metallic color or pearl color.

In a process for producing a non-coated exterior panel using this colored resin, since a coloring pigment is superfluously dispersed in a whole resin, when an expensive pigment is used, a colored resin itself costs dear and hence, the process is not economical.

There is a proposed process for forming a weatherable polymer cast film comprising a pigment on a polymer substrate as a non-coated resin exterior panel (Japanese Patent Publication No. 4-20782 (U.S. Pat. Nos. 5,536,539, 5,514,427 and 5,342,666)). However, this process is not economical because of its layer structure.

There is also disclosed a resin laminate having a metallic gloss and consisting of a base layer of a polyolefin-based resin, a colored layer, a transparent resin layer and an acrylic ultraviolet-light-cured surface layer (Japanese Patent Publication No. 1-180338: Japanese Patent No. 2546871 (U.S. Pat. No. 5,089,291)). When a base composition is molded by injection molding which has great freedom in shape, the appearance of the laminate may deteriorate with the above layer structure.

SUMMARY OF THE INVENTION

The present invention has been made to solve the above problems of the prior art and it is an object of the present invention to provide a polypropylene-based resin exterior panel which has the same appearance qualities as a coated product though it is not coated and which is excellent in rigidity and impact resistance.

The inventors of the present invention have conducted intensive studies and have found that a combination of layers made from specific polypropylene-based resin compositions can solve the above problems. Thus, the present invention has been accomplished based on this finding.

Thus, the present invention provides a polypropylene-based resin exterior panel which comprises a laminate comprising a surface layer, an intermediate layer and a base layer, the surface layer being a layer made from a transparent polypropylene resin composition comprising a propylene-α-olefin random copolymer having a melting point lower than 155° C. and a melt flow rate of 0.5 to 30 g/10 min and a clarifying nucleating agent, the intermediate layer being a layer made from a colored polypropylene resin composition comprising a propylene-α-olefin random copolymer having a melting point lower than 155° C. and a melt flow rate of 0.5 to 30 g/10 min and a coloring pigment, and the base layer being a layer made from a polypropylene resin base composition comprising a propylene-α-olefin block copolymer having a melting point of 155° C. or higher and a melt flow rate of 2 to 100 g/10 min.

The present invention also provides a polypropylene-based resin exterior panel which comprises a laminate having an under layer between the intermediate layer and the base layer, the under layer being a layer made from an impact resistant polypropylene resin composition comprising a propylene-α-olefin block copolymer having a melting point of 120° C. or higher and a melt flow rate of 0.5 to 30 g/10 min.

The present invention also provides a polypropylene-based resin exterior panel comprising a hard coat layer made from a coating composition comprising an acrylic resin or a urethane resin on an exterior side of the surface layer.

The present invention further provides a process for producing the above polypropylene-based resin exterior panel using a injection mold, which comprises a step of forming a skin including a surface layer and an intermediate layer by laminating at least a transparent polypropylene resin composition and a colored polypropylene resin composition, a step of disposing the skin in the injection mold in such a manner that the surface layer of the skin is in contact with the injection mold, and a step of forming a base layer which is integrated with the skin by injecting and filling a molten polypropylene resin base composition into the injection mold in such a manner that the base layer is laminated on the intermediate layer of the skin.

The surface layer, the intermediate layer and the base layer constituting the exterior panel of the present invention are made from polypropylene-based resin compositions each having specific physical properties and compositions.

Superior appearance qualities such as good color tone, deep color depth and high brightness specific to coating can be obtained and excellent rigidity and impact resistance can be retained by this combination.

DETAILED DESCRIPTION OF THE INVENTION

The polypropylene-based resin exterior panel of the present invention is composed of a laminate comprising a surface layer, an intermediate layer and a base layer.

(1) Surface Layer

The surface layer is a highly transparent polypropylene resin layer made from a transparent polypropylene resin composition comprising a propylene-α-olefin random copolymer and a clarifying nucleating agent. Thereby, an exterior panel molding can obtain superior color depth and brightness for its appearance.

The propylene-α-olefin random copolymer used herein has a melting point lower than 155° C., preferably not lower than 120° C. and lower than 155° C. and a melt flow rate (to be abbreviated as MFR hereinafter) of 0.5 to 30 g/10 min. If the melting point is lower than 120° C., the productivity of the polypropylene resin itself will be lower whereas if the melting point is higher than 155° C., the surface layer may become turbid, change its color or be cracked by ball dropping test at a low temperature. If MFR is less than 0.5 g/10 min, transparency and moldability will be lower whereas if MFR is higher than 30 g/10 min, the surface layer may be cracked by ball dropping test at a low temperature.

Examples of the α-olefin in the propylene-α-olefin random copolymer include ethylene, 1-butene, 1-pentene, 1-hexene, 1-octene, 1-decene, 1-dodecene, 3-methyl-1-butene, 4-methyl-1-pentene, 3-methyl-1-pentene and the like. In the copolymers using the above examples of α-olefin, particularly preferred are a propylene-ethylene random copolymer, propylene-ethylene-1-butene random copolymer and the like. The proportion of the α-olefin can be selected such that the copolymer should have a melting point within the above range, preferably 1.5 to 8 wt % of the comonomer content in the whole of the copolymer.

The type and amount of the clarifying nucleating agent to be blended into the propylene-α-olefin random copolymer are suitably selected so as to provide transparency, color, impact resistance, heat resistance, moldability and the like suitable for the final application. Specifically, dibenzylidene sorbitol derivatives which are widely used as a clarifying nucleating agent for crystalline resins such as polypropylene can be used as the clarifying nucleating agent. Preferred dibenzylidene sorbitol derivatives include alcohols such as 1,3,2,4-dibenzylidene sorbitol, 1,3,2,4-di(p-methylbenzylidene)-sorbitol and 4-p-methylbenzylidene sorbitol. The blending proportion of the nucleating agent is preferably 0.05 to 0.5 wt %, more preferably 0.1 to 0.35 wt % of the transparent polypropylene resin composition forming the surface layer. Within the above range, good transparency, color, impact resistance, heat resistance, moldability and the like can be obtained.

The transparent polypropylene resin composition can contain other additives such as a stabilizer, a pigment, a weathering agent, a lubricant and an antistatic agent if they do not impair the purpose of the present invention.

The thickness of the surface layer is not particularly limited but preferably 0.01 to 0.2 mm, more preferably 0.03 to 0.1 mm. If the thickness is too small, the color depth and brightness will be lower whereas if the thickness is too large, the transparency will be insufficient and the large thickness may be economically disadvantageous.

(2) Intermediate Layer

The intermediate layer of the present invention is a colored polypropylene resin layer made from a colored polypropylene resin composition comprising a propylene-α-olefin random copolymer and a coloring pigment. The intermediate layer is a colored layer for decorating the appearance of a molding.

The propylene-α-olefin random copolymer used herein has a melting point lower than 155° C., preferably not lower than 120° C. and lower than 155° C. and MFR of 0.5 to 30 g/10 min. If the melting point is lower than 120° C., the productivity of the polypropylene resin itself will be lower whereas if the melting point is higher than 155° C., the intermediate layer may be cracked by ball dropping test at a low temperature. If MFR is less than 0.5 g/10 min, the dispersibility of the coloring pigment will be lower and a molding will deteriorate in appearance due to the generation of granules of pigments in the molding. If MFR is more than 30 g/10 min, the sheet moldability of the copolymer will be lower and the intermediate layer may be cracked by ball dropping test at a low temperature.

Examples of the α-olefin in the propylene-α-olefin random copolymer include ethylene, 1-butene, 1-pentene, 1-hexene, 1-octene, 1-decene, 1-dodecene, 3-methyl-1-butene, 4-methyl-1-pentene, 3-methyl-1-pentene and the like. In the copolymers using the above examples of α-olefin, particularly preferred are a propylene-ethylene random copolymer, propylene-ethylene-1-butene random copolymer and the like. The proportion of the α-olefin can be selected such that the copolymer should have a melting point within the above range, preferably 1.5 to 8 wt % of the comonomer content in the whole of the copolymer.

The type and amount of the coloring pigment to be blended into the propylene-α-olefin random copolymer can be suitably selected so as to provide color, impact resistance, heat resistance, moldability and the like suitable for the final application. Specifically, the coloring pigment is a commonly used organic or inorganic pigment such as carbon black, titanium oxide, quinacridone red, cadmium yellow and cobalt blue. In addition, an aluminum flake pigment which provides a metallic appearance, a mica flake pigment such as interference mica and coloring mica which provides a pearly appearance or the like is suitably used as a reflective flake pigment.

The amount of the coloring pigment is preferably 0.1 to 30 parts by weight, more preferably 0.2 to 20 parts by weight based on 100 parts by weight of the propylene-α-olefin copolymer. Within the above range, good color, impact resistance, heat resistance, moldability and the like can be obtained.

This colored polypropylene resin composition can contain other additives such as a stabilizer, a nucleating agent, a weathering agent, a lubricant, a pigment dispersant, an antistatic agent and the like if they do not impair the purpose of the present invention.

The intermediate layer which is such a colored polypropylene resin layer preferably has a thickness of 1 mm or less, and the relationship between the thickness "d" in mm and the concentration "a" in wt % of the coloring pigment in the colored polypropylene resin composition satisfies the expression (I):

$$0.1 \leq d \times a \leq 6 \tag{I}$$

More preferably, the relationship between the thickness "d" and the concentration "a" of the coloring pigment satisfies the expression (II):

$$0.1 \leq d \times a \leq 3 \tag{II}$$

If d×a is below the above range, color will become too weak to obtain the same color as that of a coating film. If d×a is too large or the thickness is more than 1 mm, the resulting intermediate layer will be economically disadvantageous. The thickness of the intermediate layer is preferably 0.01 to 0.5 mm, more preferably 0.03 to 0.4 mm.

(3) Base Layer

The base layer of the present invention is made from a polypropylene resin base composition comprising a propylene-α-olefin block copolymer. This layer is the substrate of a molding and preferably has such high rigidity and high impact resistance that it can substitute a steel panel. A propylene homopolymer and a propylene-based random copolymer have insufficient impact resistance, particularly impact resistance at low temperatures, which makes them unsuitable for use in an exterior panel.

The propylene-α-olefin block copolymer used herein has a melting point of 155° C. or higher and MFR of 2 to 100 g/10 min, preferably 4 to 100 g/10 min. If the melting point is lower than 155° C., rigidity will be lower. If MFR is less than 2 g/10 min or more than 100 g/10 min, injection moldability and injection press moldability will deteriorate. That is, since the flowability of the resin becomes high when MFR is too large, such molding inconvenience may occur as a reduction in impact resistance, easy production of burrs or jetting. Since the flowability of the resin becomes low when MFR is too small, such inconvenience may occur as whitening, underfilling of a portion far from a gate, warp or deformation.

Examples of the α-olefin in the propylene-α-olefin block copolymer of the base layer include ethylene, 1-butene, 1-pentene, 1-hexene, 1-octene, 1-decene, 1-dodecene, 3-methyl-1-butene, 4-methyl-1-pentene, 3-methyl-1-pentene and the like. En the copolymers using the above examples of α-olefin, particularly preferred is a propylene-ethylene block copolymer. The proportion of the α-olefin can be selected such that the copolymer should have a melting point within the above range, preferably 4 to 20 wt % of the comonomer content in the whole of the copolymer.

To substitute a steel panel, the base layer is preferably a polypropylene resin layer having high rigidity and high impact resistance and made from a composition comprising a propylene-α-olefin block copolymer, an elastomer and an inorganic filler. The types and amounts of the elastomer and the inorganic filler can be selected so as to provide high rigidity, impact resistance, heat resistance, dimensional stability, moldability and the like suitable for the final application.

The elastomer may be selected from ethylene-based elastomers and styrene-based elastomers. The ethylene-based elastomers include ethylene-propylene copolymer rubber, ethylene-propylene-diene copolymer rubber and the like. Out of these, an ethylene-α-olefin random copolymer is preferably used. They may be used alone or in admixture. Examples of the α-olefin contained in the ethylene-α-olefin copolymer include propylene, 1-butene, 1-octene and the like. The content of ethylene is preferably 40 to 80 wt %. The styrene-based elastomers include a styrene-ethylene-1-butene-styrene block copolymer, styrene-ethylene-propylene-styrene block copolymer and the like.

The amount of the elastomer is preferably 5 to 50 parts by weight, more preferably 10 to 40 parts by weight based on 100 parts by weight of the propylene-α-olefin block copolymer base composition forming the base layer. Within the above range, excellent impact resistance can be obtained while rigidity is retained.

Examples of the inorganic filler include talc, mica, wallastonite, calcium carbonate, magnesium oxide, potassium titanate, glass fiber and the like. Out of these, talc is preferred. They may be used alone or in admixture. The formulation amount of the inorganic filler is preferably 5 to 50 parts by weight, more preferably 10 to 40 parts by weight based on 100 parts by weight of the propylene-α-olefin block copolymer base composition forming the base layer. Within the above range, excellent rigidity can be obtained while impact resistance is retained.

The base layer can contain other additives such as a stabilizer, pigment, nucleating agent, weathering agent and the like if they do not impair characteristic properties of the base layer.

The pigment is a coloring pigment which is commonly used for coloring black, gray or white, such as carbon black or titanium oxide and the like.

The thickness of the base layer is preferably 1 to 7 mm, more preferably 2 to 5 mm. If the thickness is larger than 7 mm, a weight reduction cannot be attained, which is economically disadvantageous, as compared with a steel panel. If the thickness is smaller than 1 mm, the rigidity of the resulting molding will be insufficient.

(4) Under Layer

In the present invention, an under layer made from a impact resistant polypropylene resin composition can be formed between the intermediate layer and the base layer. The under layer is aimed to back up the colored layer to prevent it from being damaged by the heat and pressure of the molten base composition and being thinned to change its color when the base layer is to be formed by injection molding, to provide rigidity and impact resistance to the laminate sheet, and to bring out the color of the colored layer into prominence.

The impact resistant polypropylene resin composition used herein comprises a propylene-α-olefin block copolymer having a melting point of 120° C. or higher and MFR of 0.5 to 30 g/10 min. If the melting point is lower than 120° C., the productivity of the polypropylene resin itself will lower. If MFR is less than 0.5 g/10 min or more than 30 g/10 min, the sheet moldability and thermal moldability of the composition may deteriorate.

Examples of the α-olefin contained in the propylene-α-olefin block copolymer of the under layer include ethylene, 1-butene, 1-pentene, 1-hexene, 1-octene, 1-decene, 1-dodecene, 3-methyl-1-butene, 4-methyl-1-pentene, 3-methyl-1-pentene and the like. In the copolymers using the above examples of α-olefin, particularly preferred is a propylene-ethylene block copolymer. The proportion of the α-olefin can be selected such that the copolymer should have a melting point within the above range, and is preferably 4 to 20 wt % of the comonomer content in the whole of the copolymer.

By forming this under layer, it is possible to prevent the skin from being damaged by the molten base composition to change the thickness of the intermediate layer and the color of the exterior panel when the base composition is injection molded together with the laminate of a surface layer and an intermediate layer as a skin.

The under layer is preferably colored black, gray or white to bring out the color of the intermediate layer into prominence. Coloring pigments used to color the under layer the above colors include carbon black, titanium oxide and the like.

The under layer can contain other additives such as a stabilizer, a weathering agent, a lubricant and an antistatic agent if they do not impair the purpose of the present invention.

(5) Hard Coat Layer

In the laminate used in the present invention, a hard coat layer can be formed on a surface of the surface layer in addition to the surface layer, the intermediate layer and the base layer. By forming the hard coat layer, the scratch resistance and weatherability of the surface of the exterior panel which is a molding are improved. A resin composition (coating composition) forming the hard coat layer can be suitably selected to fit the final application. Preferably, it is essentially composed of an acrylic resin or urethane resin. The acrylic resin includes a methyl methacrylate homopolymer, a methyl methacrylate copolymer and the like, and the urethane resin includes a reaction product between 4,4-methylenebis(phenylisocyanate) and polyethylene adipate and the like. The hard coat layer may be obtained by applying a known photocurable resin composition comprising an acrylic or urethane oligomer or resin, a photopolymerization initiator, a diluent and the like and irradiating the composition with ultraviolet light or the like to cure it.

The thickness of the hard coat layer is preferably 0.005 to 0.07 mm, more preferably 0.01 to 0.05 mm. Within this range, the hard coat layer fully exhibits the effect of improving the scratch resistance and weatherability of the surface of the exterior panel and is economically satisfactory.

The hard coat layer may be formed on a surface of the surface layer of the laminate comprising the under layer between the intermediate layer and the base layer.

A protective film layer may be further formed on a surface of the hard coat layer. The protective film layer is provided to protect the surface of the exterior panel from dirt, dust and the like mainly in a step following the production of the skin. A resin composition forming the protective film layer is polypropylene or the like. The thickness of the protective film layer is preferably 0.01 to 0.1 mm, more preferably 0.02 to 0.08 mm. Within this range, the protective film layer fully exhibits the effect of protecting the surface of the skin and is satisfactory economically.

An adhesive layer can further be formed between adjacent layers among the surface layer, the intermediate layer, the under layer, the base layer, the hard coat layer and the protective layer, to bond these layers together. A resin composition forming the adhesive layer is not limited to a particular kind if it is a resin used to form an adhesive layer for a general laminate and is exemplified by modified polyolefins comprising an unsaturated monomer and the like.

(7) Process for producing polypropylene-based resin exterior panel

The process for producing the polypropylene-based resin exterior panel of the present invention is not particularly limited, but the process uses an injection mold preferably and comprises the step of forming the skin including the surface layer and the intermediate layer by laminating the transparent polypropylene resin composition and the colored polypropylene resin composition, the step of disposing the skin in the injection mold in such a manner that the surface layer is in contact with the injection mold, and the step of forming the base layer integrated with the skin by injecting and filling a molten polypropylene resin base composition in the injection mold in such a manner that the base layer is laminated on the intermediate layer of the skin.

Methods for laminating the transparent polypropylene resin composition and the colored polypropylene resin composition include an extrusion lamination method, a coextrusion lamination method (T die method and inflation method), a dry lamination method and the like which are generally used for the production of polyolefin sheets.

Methods for disposing the skin in the injection mold include one in which the skin is pressure formed in the injection mold and disposed in such a manner that it is in contact with the mold, one in which the skin is pressure formed with a preforming mold and then disposed in the injection mold in such a manner that it is in contact with the injection mold, and the like. Vacuum forming is not preferred in some cases because the skin may have traces of vacuum holes in the mold.

Injection molding method and apparatus which are known can be used to form the base layer integrated with the skin. That is, in the above step of forming the base layer, the molten polypropylene resin base composition is injected and filled in the injection mold to form the base layer. Injection press molding is preferably used. The injection press molding is a process comprising setting the opening of a mold to that larger than the desired thickness of the molding, injecting a molten resin, closing the mold to the desired thickness of the molding (products), and is advantageous in the reduction of the mold-clamping force for a molding having a relatively large area such as an exterior panel and in protecting the good touch of the skin.

Although injection molding or injection press molding conditions including resin temperature, injection pressure and clamping force can be suitably selected according to the size of the exterior panel and the like, the molten resin is generally injected at a temperature of 190 to 250° C. and a pressure of 5 to 120 MPa and the injection mold is generally clamped at a pressure of 5 to 25 MPa.

To form the laminate having the under layer between the intermediate layer and the base layer, the transparent polypropylene resin composition, the colored polypropylene resin composition and the impact resistant polypropylene resin composition are laminated together in the step of forming the skin to form the skin including the surface layer, the intermediate layer and the under layer, the obtained skin is disposed in an injection mold (skin disposing step), and the skin and the base layer are integrally molded by injecting and filling the polypropylene resin base composition.

Methods for laminating the transparent polypropylene resin composition, the colored polypropylene resin composition and the impact resistant polypropylene resin composition include an extrusion lamination method, a coextrusion lamination method (T die method and inflation method), a dry lamination method and the like which are generally used for the production of polyolefin sheets as described above.

To form the hard coat layer on the exterior side of the surface layer, at least the coating composition, the transparent polypropylene resin composition and the colored polypropylene resin composition are laminated together in the step of forming the skin to form the skin including the hard coat layer, the surface layer and the intermediate layer, the obtained skin is disposed in the injection mold (skin disposing step), and the skin and the base layer are integrally molded by injecting and filling the polypropylene resin base composition to obtain a laminate having the hard coat layer on the exterior side of the surface layer.

Specifically, after the laminate of the surface layer and the intermediate layer is first formed in the step of forming the skin, the coating composition comprising an acrylic resin or a urethane resin is applied to the surface layer of the laminate to form the hard coat layer. Preferably, after the transparent polypropylene resin composition and the colored polypropylene resin composition are laminated together, the exterior side (surface side) of the surface layer (highly transparent polypropylene resin layer) of the laminate is subjected to a surface treatment such as corona discharge treatment, flame treatment, plasma treatment or electron beam treatment, and a coating composition is applied to the surface layer to form the hard coat layer. Alternatively, after the above surface treatment, the hard coat layer can be formed by coating a known photocurable resin composition comprising an acrylic or urethane oligomer or resin, a photopolymerization initiator and the like on the surface layer and irradiating it with ultraviolet light or the like to cure it.

In the case of forming the laminate having the under layer between the intermediate layer and the base layer, the hard coat layer can be formed on he surface of the surface layer. In this case, after the lamination of the surface layer, the intermediate layer and the under layer, the hard coat layer is formed by applying the coating composition to the surface layer of the laminate by the above-described method.

As a noteworthy method making use of an uncured hard coat layer, a composite layer comprising a hard coat layer and a release film is disclosed in Japanese Patent Publication No. 6-15179.

The polypropylene-based resin exterior panel of the present invention can attain superior appearance qualities such as good color tone, deep color depth and high brightness specific to coating, has excellent rigidity and impact resistance and is useful as an exterior panel for an automobile or a home electric appliance such as a washing machine, a refrigerator and the like. Particularly when a reflective flake pigment such as an aluminum flake pigment and a mica flake pigment is used as a coloring pigment, it is possible to provide the same metallic or pearly appearance as a coated product, which makes the exterior panel of the present invention to be suitable for use as an exterior panel for an automobile.

EXAMPLES

The following examples are given to further illustrate the present invention with reference to the accompanying drawings. Measurement methods and evaluation methods of physical properties in the following examples are as follows.

[melting point] Measured using a differential scanning calorimeter of Seiko Co.

[MFR] Measured at a temperature of 230° C. under a load of 2.16 kg using the melt indexer of Takara Co. in accordance with JIS-K-7203.

[turbidity] The turbidity of a molding is observed visually and evaluated as o when the molding is clear and x when it is turbid.

[color depth] The color depth of a molding is compared with that of a coated product and evaluated as o when the molding is equivalent to the coated product and x when it is inferior to the coated product in color depth.

[pigment dispersibility] The appearances of a skin sheet and a molding are observed visually and evaluated as o when the dispersibility of the pigment is good and x when it is poor.

[falling ball impact test] A 50×50 mm test sample is cut out from a flat surface portion of a molding and made 0° C. in temperature, and a 500 g iron ball is dropped onto a central portion of the base layer side of the test sample from a height of 50 cm. The sample is evaluated as o when a crack is not observed on the surface layer side of the test sample and x when the crack is observed.

Example 1

In this example, a skin including a surface layer and an intermediate layer was formed by an extrusion lamination method and disposed in an injection mold, and then a base layer was formed by injection molding to produce an exterior panel for a refrigerator.

Figure 1:
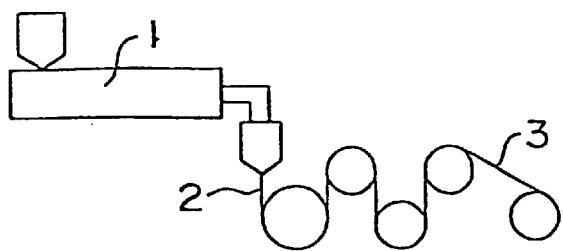
FIG. 1 shows the skin-forming step of Example 1, wherein (a) shows the step of forming a colored polypropylene resin sheet by an extruder and (b) shows the step of laminating a colored polypropylene resin sheet and a highly transparent polypropylene resin sheet.
Figure 1:
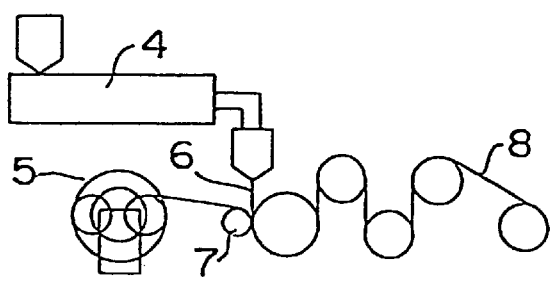

FIG. 1, (a) and (b) show the skin-forming step of this example. FIG. 1, (a) shows the step of forming a colored polypropylene resin sheet by an extruder. FIG. 1, (b) shows the step of laminating the colored polypropylene resin sheet and a highly transparent polypropylene resin sheet together.

A colored polypropylene resin composition 2 which was colored a predetermined color was extruded from an extrusion molding machine 1 (cylinder set temperature of 210° C.) of FIG. 1, (a) and cooled immediately to produce a colored polypropylene resin sheet 3 which was rolled round a take-up roller. The rolled colored polypropylene resin sheet 3 was placed in a feed portion 5 of an extrusion molding machine 4 in FIG. 1, (b) to be laminated.

Thereafter, a transparent polypropylene resin composition 6 was extruded from the extrusion molding machine 4 (cylinder set temperature of 210° C.), laminated with the colored polypropylene resin sheet 3 supplied from the feed portion 5 by a touch roller 7, and cooled immediately to produce a skin sheet 8 in which the transparent polypropylene resin composition 6 is laminated on the colored polypropylene resin sheet 3. The skin sheet 8 was rolled round a take-up roller.

Figure 2:
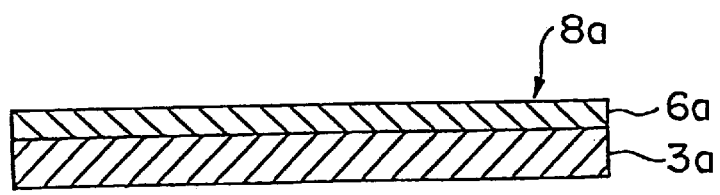
FIG. 2 is a sectional view of a panel-like skin obtained in Example 1.

The thus formed skin sheet 8 was cut out to a desired size by a cutter to prepare a panel-like skin 8a (60 cm×100 cm). FIG. 2 is a sectional view of the skin 8a. The skin 8a (thickness of 0.4 mm) was a laminate of the highly transparent polypropylene resin layer 6a (surface layer having a thickness of 0.1 mm) and the colored polypropylene resin layer 3a (intermediate layer having a thickness of 0.3 mm).

Thereafter, the skin 8a was pressure-formed and disposed in an injection mold, and a polypropylene resin base composition was injected and filled in the injection mold to form a base layer. This skin-disposing step and the base layer-forming step are shown in FIG. 3, (a)–(c).

Figure 3:
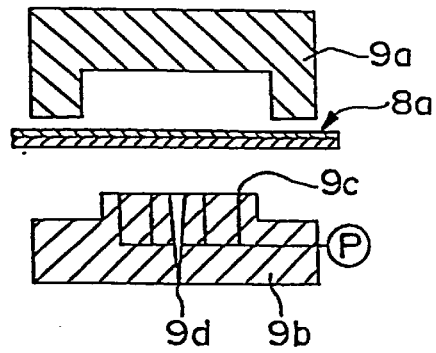
FIG. 3 shows the skin-disposing step and the base layer forming step of Example 1, wherein (a) shows that a panel-like skin is disposed between a movable mold piece (upper mold piece) and a fixed mold piece (lower mold piece), (b) shows that the skin is pressure-formed in the mold, and (c) shows that a polypropylene resin base composition is injected and filled.
Figure 3:
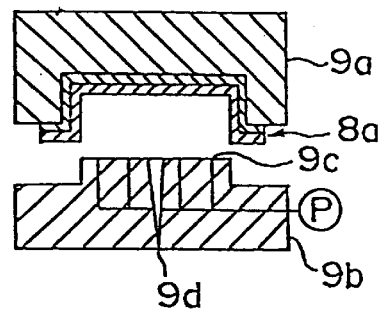
Figure 3:
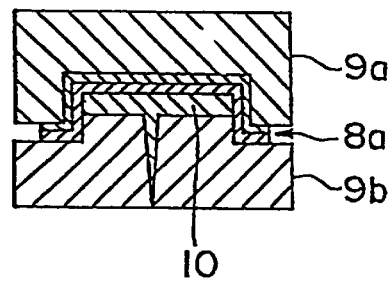

Namely, after the skin 8a was heated (140° C.), it was placed between an upper mold piece 9a (movable mold piece) and a lower mold piece 9b (fixed mold piece) in such a manner that the surface layer faced up (FIG. 3, (a)). Thereafter, air was blown from air blowout holes 9c in the lower mold piece 9b (pressure: 700 kPa) to pressure-form the skin in such a manner that the surface layer of the skin was in contact with the upper mold piece 9a (FIG. 3, (b)). Then, the upper mold piece 9a was placed upon the lower mold piece 9b, a polypropylene resin base composition 10 was injected and filled in a cavity from the gate 9d of the lower mold piece 9b (injection pressure: 80 MPa, cylinder set temperature: 230° C.) (FIG. 3, (c)).

Figure 4:
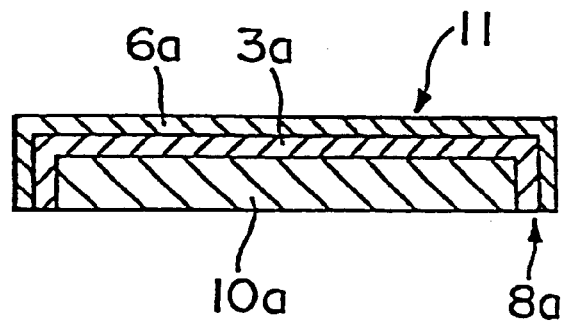
FIG. 4 shows explanatory drawings for Example 1 wherein (a) is a sectional view of a molding in which the polypropylene resin base layer obtained in Example 1 is integrally fusion-bonded to the skin and (b) shows a product (refrigerator) which uses the molding obtained in Example 1 as an exterior panel.
Figure 4:
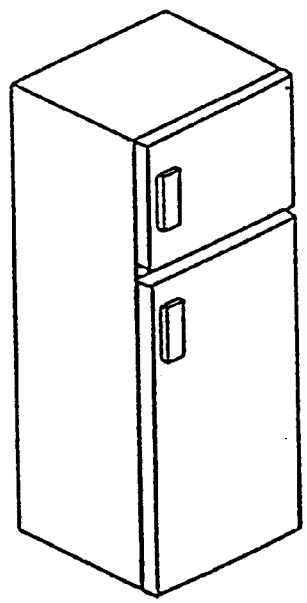

After the polypropylene resin base composition 10 was solidified by cooling, the upper and lower mold pieces 9a and 9b were separated from each other to take out a molding. Thus, the molding 11 (40 cm×80 cm) in which the polypropylene resin layer 10a (base layer having a thickness of 2.5 mm) was integrally fusion-bonded to the skin 8a was obtained. FIG. 4, (a) is a sectional view of the molding 11.

The transparent polypropylene resin composition used in this example comprises 100 parts by weight of a propylene-ethylene random copolymer having a melting point of 148° C. and an MFR of 2.0 g/10 min and 0.2 part by weight of 1,3,2,4-bis(p-methylbenzylidene)sorbitol as a clarifying nucleating agent. This colored polypropylene composition comprises 100 parts by weight of a propylene-ethylene random copolymer having a melting point of 138° C. and an MFR of 2.0 g/10 min and 1.5 parts by weight of titanium oxide as a coloring pigment. The polypropylene resin base composition comprises 100 parts by weight of a propylene-ethylene block copolymer having a melting point of 165° C. and an MFR of 30 g/10 min and 1.5 parts by weight of titanium oxide as a coloring pigment.

FIG. 4, (b) shows a product (refrigerator) which uses the molding obtained in this example as an exterior panel. In FIG. 4, (b), the exterior panel of this example is used for a side surface portion of the refrigerator.

Example 2

In this example, a laminate sheet of a surface layer and an intermediate layer was formed by a coextrusion lamination method (T die method) and then a hard coat layer was formed on the laminate sheet to prepare a skin. This skin was disposed in an injection mold and a base layer was formed by injection molding to produce an exterior panel for a motor bicycle.

Figure 5:
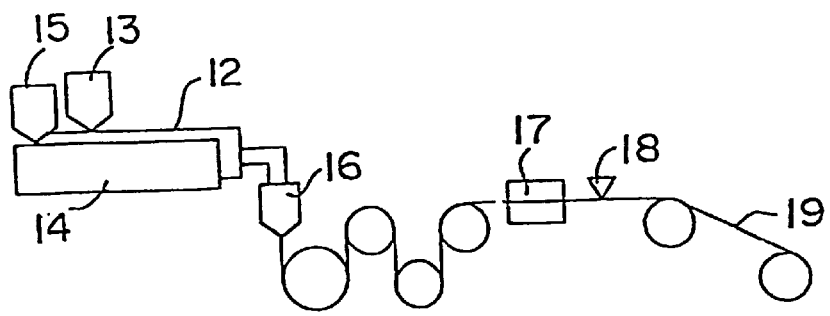
FIG. 5 shows the skin-forming step of Example 2.
Figure 5:
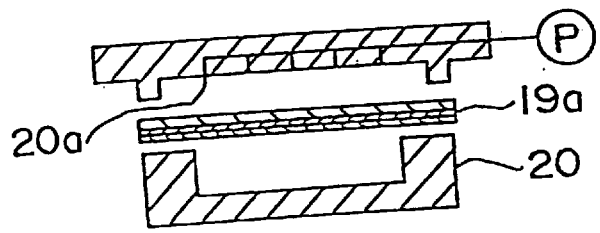

FIG. 5 shows the step of forming the skin. A transparent polypropylene resin composition 13 and a colored polypropylene resin composition 15 colored a predetermined color were supplied from a first extrusion molding machine 12 (cylinder set temperature of 210° C.) and a second extrusion molding machine 14 (cylinder set temperature of 210° C.), respectively, to a coextrusion T die 16 to be coextruded so as to produce a laminate sheet having a highly transparent polypropylene resin layer (surface layer) and a colored polypropylene resin layer (intermediate layer).

This laminate sheet was cooled immediately, and the outer surface of the surface layer was subjected to a corona discharge treatment by a surface treatment unit 17. A coating composition (hard coat solution) 18 was coated on the outer surface of the surface layer having thus treated, and the resulting laminate was rolled round a take-up roller to produce a skin sheet 19 having a hard coat layer 18a. The skin sheet 19 was cut to a desired size to prepare a panel-like skin 19a (50 cm×100 cm).

Figure 6:
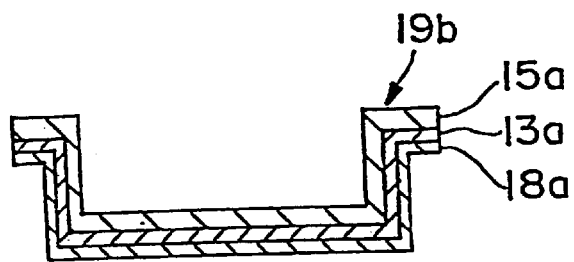
FIG. 6 shows explanatory drawings for Example 2 wherein (a) shows the pressure-forming step of Example 2 and (b) is a sectional view of the skin obtained in Example 2.

Thereafter, the skin 19a was preformed by pressure-forming into a skin 19b to be disposed in an injection mold. This pressure-forming step is shown in FIG. 6, (a) and a sectional view of the obtained skin 19b is shown in FIG. 6, (b). That is, the skin 19a was heated (140° C.) and placed in a pressure mold 20, air was blown from air blowout holes 20a (pressure: 700 kPa) to pressure-form the skin 19a (FIG. 6, (a)) to produce a skin 19b which was a pressure-formed product. The skin 19b (thickness of 0.4 mm) had the highly transparent polypropylene resin layer 13a (thickness of 0.1 mm), the colored polypropylene resin layer 15a (thickness of 0.3 mm) and the hard coat layer 18a (thickness of 0.02 mm) (FIG. 6, (b)).

Figure 7:
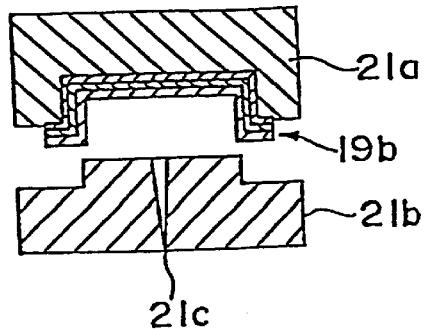
FIG. 7 shows the skin-disposing step and the base layer-forming step of Example 2, wherein (a) shows that the skin is disposed in contact with a movable mold piece (upper mold piece) and (b) shows that a polypropylene resin base composition is injected and filled.
Figure 7:
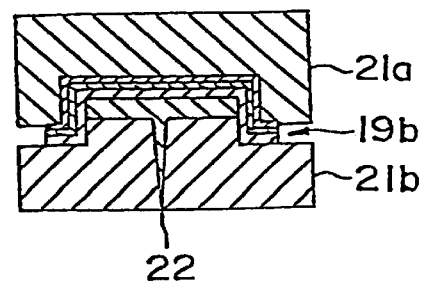

Thereafter, the skin 19b was placed in the injection mold and a polypropylene resin base composition was injected and filled in the injection mold to form a base layer. This skin-disposing step and the base layer-forming step are shown in FIG. 7. FIG. 7, (a) shows that the skin 19b was arranged to be in contact with a movable mold piece (upper mold piece 21a). FIG. 7, (b) shows that the polypropylene resin base composition was injected and filled by placing the movable mold piece (upper mold piece 21a) upon a fixed mold piece (lower mold piece 21b).

Namely, the skin 19b was heated (80° C.) and arranged to be in contact with the movable mold piece (upper mold piece 21a), the upper mold piece 21a was placed on the lower mold piece 21b, and the polypropylene resin base composition 22 was injected and filled into a cavity from the gate 21c of the lower mold piece 21b (injection pressure: 80 MPa, cylinder set temperature: 230° C.).

Figure 8:
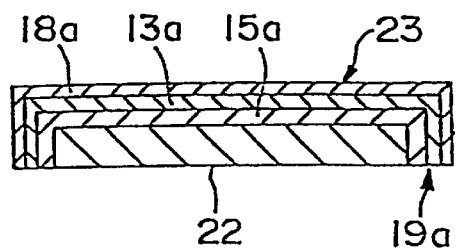
FIG. 8 shows explanatory drawings for Example 2 wherein (a) shows a sectional view of a molting in which the polypropylene resin base layer obtained in Example 2 is integrally fusion-bonded to the skin and (b) shows a product (motor bicycle) which uses the molding obtained in Example 2 as an exterior panel.
Figure 8:
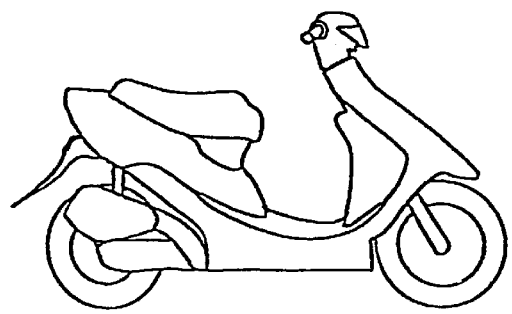

This polypropylene resin base composition 22 was solidified by cooling, and the upper and lower mold pieces 21a and 21b were separated from each other to take out a molding. Thus, the molding 23 in which the polypropylene resin base layer 22a (base layer having a thickness of 2.5 mm) was integrally fusion-bonded to the skin 19b was obtained. FIG. 8, (a) is a sectional view of the molding 23.

The highly transparent polypropylene resin composition used in this example contained 100 parts by weight of a propylene-ethylene random copolymer having a melting point of 148° C. and an MFR of 7.0 g/10 min and 0.2 part by weight of 1,3,2,4-bis(p-methylene-benzylidene)sorbitol as a clarifying nucleating agent. The colored polypropylene composition contained 100 parts by weight of a propylene-ethylene random copolymer having a melting point of 138° C. and an MFR of 2.0 g/10 min and 1.0 part by weight of carbon black as a coloring pigment. The polypropylene resin base composition contained 100 parts by weight of a propylene-ethylene block copolymer having a melting point of 165° C. and an MFR of 10 g/10 min and 1.0 part by weight of carbon black as a coloring pigment. The coating composition forming the hard coat layer was an acryl urethane resin.

FIG. 8, (b) shows a product (motor bicycle) which uses the molding obtained in this example as an exterior panel. In FIG. 8, (b), the exterior panel of this example is used for the fender.

Example 3

In this example, a laminate sheet having a surface layer, an intermediate layer and an under layer was formed by an coextrusion lamination method (T die method) and disposed in an injection mold as a skin, and a base layer was formed by injection mold to produce an exterior panel for a refrigerator.

A transparent polypropylene resin composition containing a propylene-ethylene random copolymer having a melting point of 148° C. and an MFR of 7.0 g/10 min and 0.2 wt % of 1,3,2,4-bis(p-methylbenzylidene)sorbitol as a sorbitol-based clarifying nucleating agent, a colored polypropylene resin composition colored a predetermined color by blending 10 parts by weight of a mixture of quinacridone red and pearl mica as a coloring pigment with 100 parts by weight of a propylene-ethylene random copolymer having a melting point of 138° C. and an MFR of 5.0 g/10 min, and an impact resistant polypropylene resin composition containing 100 parts by weight of a propylene-ethylene block copolymer having a melting point of 165° C. and an MFR of 2.0 g/10 min and 0.15 part by weight of a mixture of titanium oxide and carbon black as a coloring pigment were molten and kneaded with a first extruder, a second extruder and a third extruder, respectively, and supplied to a single coextrusion die to be coextruded.

The coextruded laminate sheet was cooled immediately to produce a three-layer structured skin sheet (layer A, 0.1 mm/layer B, 0.3 mm/layer C, 0.4 mm) having layer A (surface layer of the transparent polypropylene resin composition), layer B (intermediate layer of the colored polypropylene resin composition) and layer C (under layer of the impact resistant polypropylene resin composition).

A molding was obtained in the same manner as in Example 1 except the thus formed skin sheet was used.

Example 4

A molding was obtained in the same manner as in Example 1 except that a transparent polypropylene resin composition containing a propylene-ethylene random copolymer having a melting point of 138° C. and an MFR of 6.0 g/10 min and 0.2 wt % of the clarifying nucleating agent was used for layer A.

Example 5

A molding was obtained in the same manner as in Example 1 except that a propylene-ethylene random copolymer having a melting point of 125° C. and an MFR of 5.0 g/10 min was used for layer B.

Example 6

A transparent polypropylene resin composition containing a polypropylene-ethylene random copolymer having a melting point of 148° C. and an MFR of 7.0 g/10 min and 0.2 wt % of a clarifying nucleating agent, a colored polypropylene resin composition colored a predetermined color by blending 10 parts by weight of a mixture of quinacridone red and pearl mica as a coloring pigment with a propylene-ethylene random copolymer having a melting point of 138° C. and an MFR of 5.0 g/10 min, and an impact resistant polypropylene resin composition colored gray by blending 0.15 part by weight of a mixture of titanium oxide and carbon black as a coloring pigment with a propylene-ethylene block copolymer having a melting point of 165° C. and an MFR of 2.0 g/10 min were molten and kneaded by a first extruder, a second extruder and a third extruder, respectively, and supplied to a single coextrusion die to be coextruded.

The coextruded laminate sheet was cooled immediately to produce a three-layer structured skin sheet (layer A, 0.1 mm/layer B, 0.3 mm/layer C, 0.4 mm) having layer A (surface layer of the transparent polypropylene resin composition), layer B (intermediate layer of the colored polypropylene resin composition) and layer C (under layer of the impact resistant polypropylene resin composition). A molding was obtained in the same manner as in Example 2 except the thus formed laminate sheet was used.

Example 7

In this example, a laminate sheet having a surface layer, an intermediate layer and an under layer was formed by a coextrusion lamination method (T die method), an uncured hard coat layer was formed on the laminate sheet to prepare a skin, the skin was disposed in an injection mold, a base layer was formed by injection press molding, and the hard coat layer was cured to produce an exterior panel for an automobile.

Figure 9:
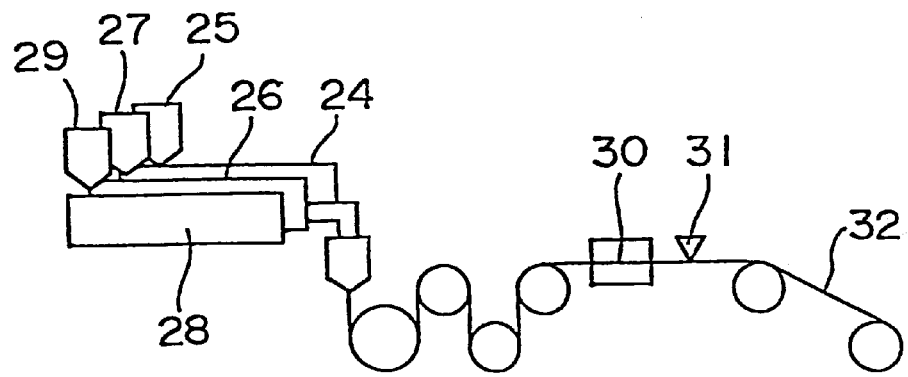
FIG. 9 shows the skin-forming step of Example 7.
Figure 9:
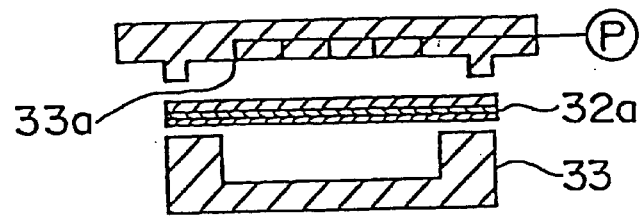

The skin-forming step is shown in FIG. 9. A transparent polypropylene resin composition 25, a colored polypropylene resin composition 27 colored a predetermined color and an impact resistant polypropylene resin composition 29 colored gray were molten and kneaded with an extruder 24 (cylinder set temperature of 210° C.), an extruder 26 (cylinder set temperature of 210° C.) and an extruder 28 (cylinder set temperature of 210° C.), respectively and supplied to a single coextrusion T die.

The coextruded laminate sheet was cooled immediately, and the outer surface of the surface layer was subjected to a corona discharge treatment by a surface treatment unit 30. A coating composition (hard coat solution) 31 which was curable when irradiated with ultraviolet light was applied to this surface layer having the thus treated surface, and the resulting coated laminate sheet was rolled round a take-up roller to produce a skin sheet 32 having an uncured hard coat layer 31a. The coating composition was a mixture of epoxy acrylate, dipentaerythritol hexaacrylate and dimethylbenzyl ketal.

The skin sheet 32 was cut to a desired size by a cutter to produce a panel-like skin 32a (80 cm×130 cm). This panel-like skin had a four-layer structure (layer A, 0.1 mm/layer B, 0.3 mm/layer C, 0.4 mm/uncured hard coat layer, 0.02 mm) of layer A (surface layer of the transparent polypropylene resin composition), layer B (intermediate layer of the colored polypropylene resin composition), layer C (under layer of the impact resistant polypropylene resin composition) and an uncured hard coat layer formed on the outer surface of the layer A.

Figure 10:
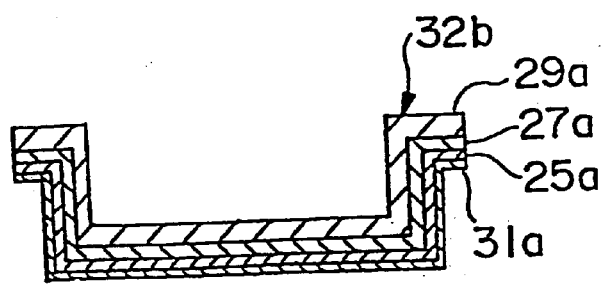
FIG. 10 shows explanatory drawings for Example 7 wherein (a) shows the pressure-forming step of Example 7 and (b) is a sectional view of the skin obtained in Example 7.

Thereafter, a skin 32b to be placed in an injection mold was prepared by pressure-forming the panel-like skin 32a. This pressure-forming step is shown in FIG. 10, (a) and a sectional view of the obtained skin 32b is shown in FIG. 10, (b). Namely, the skin 32a was heated (140° C.), disposed in a pressure mold 33 and pressure-formed by blowing air from air blowout holes 33a (pressure: 700 kPa) to produce the skin 32b which was a pressure-formed molding. The skin 32b had layer A 25a, layer B 27a, layer C 29a and uncured hard coat layer 31a (FIG. 10, (b)).

Thereafter, the skin 32b was disposed in an injection mold, and a polypropylene resin base composition was injected and filled in the injection mold to form a base layer by injection press molding. This skin-disposing step and the base layer-forming step are shown in FIG. 11.

Figure 11A:
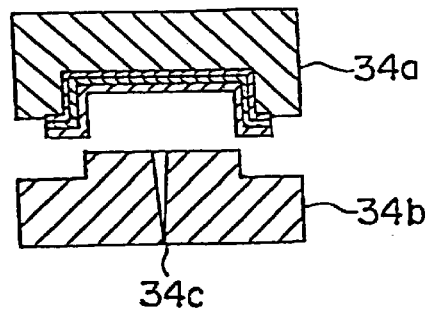
FIG. 11 shows the skin-disposing step and the base layer-forming step of Example 7, wherein (a) shows that the skin is disposed in contact with a movable mold piece (upper mold piece), (b) shows that a polypropylene resin base composition is injected and filled by setting an opening between the movable mold piece (upper mold piece) and a fixed mold piece (lower mold piece) to an opening larger than the desired thickness of the molding, and (c) shows that the mold is closed to the desired thickness of the molding.
Figure 11B:
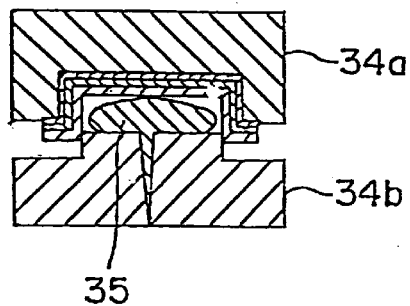
Figure 11C:
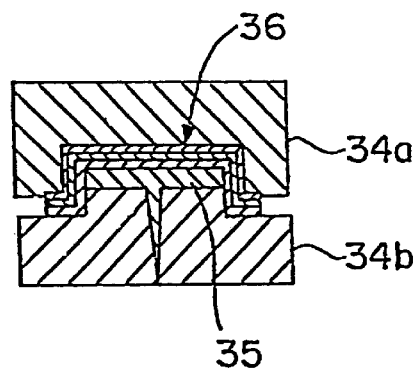

Namely, the skin 32b was heated (80° C.) and placed in contact with a movable mold piece (upper mold piece 34a) (FIG. 11, (a)), an opening between the upper mold piece 34a and the fixed mold piece (lower mold piece 34b) was set to a value larger than the desired thickness of a molding, a polypropylene resin base composition 35 was injected and filled in a cavity from the gate 34c of the lower mold piece (injection pressure: 80 MPa, cylinder set temperature: 230° C.) (FIG. 11, (b)). Then, the opening between the movable mold piece and the fixed mold piece was reduced to the desired thickness of the molding by a clamping force of 8 MPa (FIG. 11, (c)

After the polypropylene resin base composition 35 was solidified by cooling, the upper and lower mold pieces were separated from each other to take out the molding. Thus, the molding 35 in which the polypropylene resin base layer 35a (layer D: base layer having a thickness of 4.0 mm) was integrally fusion-bonded to the skin 32b was obtained.

Figure 12:
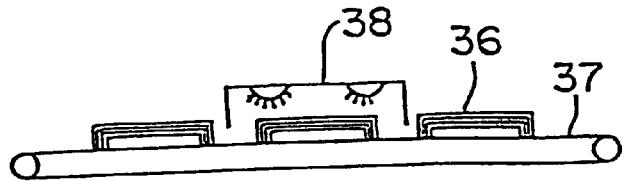
FIG. 12 shows explanatory drawings for Example 7 wherein (a) shows the ultraviolet light irradiation step of Example 7 and (b) is a sectional view of a molding in which the polypropylene resin base layer obtained in Example 7 is integrally fusion-bonded to the skin.
Figure 12:
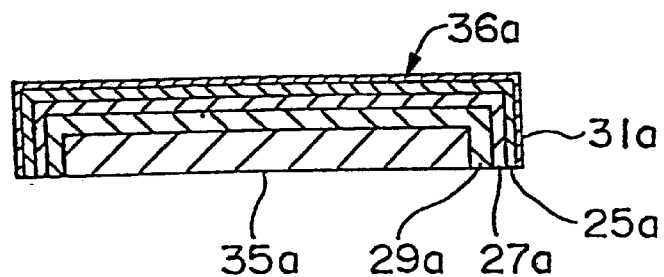

Then, the obtained molding 36 was irradiated with ultraviolet light to cure the uncured hard coat layer. The ultraviolet irradiation step is shown in FIG. 12, (a). Namely, the molding 36 was placed on a belt conveyor 37 to be introduced into a ultraviolet light furnace 38. Irradiation conditions include an output density of 120 W/cm and a conveyor speed of 4 m/min. Thereby, the uncured hard coat layer 31 was completely cured and the molding 36a having desired strength was obtained. FIG. 12, (b) is a sectional view of the molding 36a. The molding had the cured hard coat layer 31a, the highly transparent polypropylene resin layer (surface layer) 25a, the colored polypropylene resin layer (intermediate layer ) 27a, the impact resistant polypropylene resin layer (under layer) 29a and the polypropylene resin base layer 35a.

The transparent polypropylene resin composition used in this example contained 100 parts by weight of a propylene-ethylene random copolymer having a melting point of 148° C. and an MFR of 7.0 g/10 min and 0.2 part by weight of 1,3,2,4-bis(p-methylbenzylidene)sorbitol as a clarifying nucleating agent. The colored polypropylene composition contained 100 parts by weight of a propylene-ethylene random copolymer having a melting point of 138° C. and an MFR of 5.0 g/10 min and 10.0 parts by weight of a mixture of quinacridone red and pearl mica as a coloring pigment. The impact resistant polypropylene resin composition contained 100 parts by weight of a propylene-ethylene block copolymer having a melting point of 165° C. and an MFR of 20 g/10 min and 1.5 parts by weight of a mixture of titanium oxide and carbon black as a coloring pigment.

The polypropylene resin base composition contained 100 parts by weight of a propylene-ethylene block copolymer having a melting point of 165° C. and an MFR of 30 g/10 min, 30 parts by weight of ethylene-propylene copolymer rubber as an ethylene-based elastomer, 30 parts by weight of talc and 1.5 parts by weight of a mixture of titanium oxide and carbon black as a coloring pigment. The coating composition (photocurable resin composition) forming the hard coat layer was a mixture of epoxy acrylate, dipentaerythritol hexaacrylate and dimethylbenzyl ketal.

Figure 13:
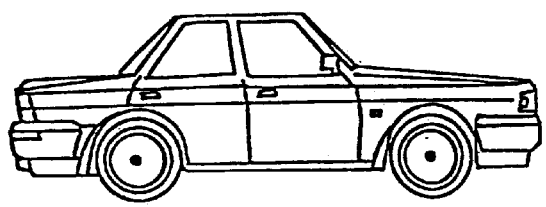
FIG. 13 shows a product (automobile) which uses the molding obtained in Example 7 as an exterior panel.

FIG. 13 shows a product (automobile) which uses the molding obtained in this example as an exterior panel. In FIG. 13, the exterior panel of this example is used for the door.

Example 8

A molding was obtained in the same manner as in Example 7 except that a polypropylene resin base composition colored gray by the same coloring pigment as in Example 7, containing 100 parts by weight of a propylene-ethylene block copolymer having a melting point of 165° C. and an MFR of 30 g/10 min and 30 parts by weight of a glass fiber having a length of 6 mm was used as the polypropylene resin base composition cf layer D.

Example 9

A molding was obtained in the same manner as in Example 7 except that a high rigid, high impact resistant polypropylene resin composition colored gray by the same coloring pigment as in Example 7, containing 100 parts by weight of a propylene-ethylene block copolymer having a melting point of 165° C. and an MFR of 30 g/10 min, 30 parts by weight of magnesium sulfate and 30 parts by weight of an ethylene-based elastomer was used as the polypropylene resin base composition of layer D.

Example 10

A molding was obtained in the same manner as in Example 7 except that a high rigid, high impact resistant polypropylene resin composition colored gray by the same coloring pigment as in Example 7, containing 100 parts by weight of a propylene-ethylene block copolymer having a melting point of 165° C. and an MFR of 30 g/10 min, 30 parts by weight of talc and 30 parts by weight of a styrene-based elastomer was used as the polypropylene resin base composition of layer D.

Comparative Example 1

A molding was obtained in the same manner as in Example 1 except that the skin had a double-layer structure (layer A, 0.1 mm/layer B, 0.3 mm) of layer A made from a transparent polypropylene resin composition composed of a propylene-ethylene random copolymer having a melting point of 148° C. and an MFR of 7.0 g/10 min and containing no clarifying nucleating agent and layer B made from a colored polypropylene resin composition containing a propylene-ethylene random copolymer having a melting point of 138° C. and an MFR of 2.0 g/10 min and the same coloring pigment in the same concentration as in Example 1.

Comparative Example 2

A molding was obtained in the same manner as in Example 1 except that the skin had a double-layer structure (layer A, 0.1 mm/layer B, 0.3 mm) of layer A made from a transparent polypropylene resin composition containing a propylene-ethylene random copolymer having a melting point of 148° C. and an MFR of 7.0 g/10 min and 0.2 wt % of the clarifying nucleating agent and layer B made from a colored polypropylene resin composition containing a propylene homopolymer having a melting point of 165° C. and an MFR of 2.0 g/10 min and the same coloring pigment as in Example 1 to be colored the same color.

Comparative Example 3

A molding was obtained in the same manner as in Example 1 except that the skin had a double-layer structure (layer A, 0.1 mm/layer B, 0.3 mm) of Layer A made from a transparent polypropylene resin composition containing a propylene-ethylene random copolymer having a melting point of 148° C. and an MFR of 7.0 g/10 min and 0.2 wt % of the clarifying nucleating agent and layer B made from a colored polypropylene resin composition containing a propylene-ethylene block copolymer having a melting point of 165° C. and an MFR of 2.0 g/10 min and the same coloring pigment as in Example 1 to be colored the same color.

Comparative Example 4

A molding was obtained in the same manner as in Example 7 except that the transparent polypropylene resin composition of layer A was composed of a propylene-ethylene random copolymer having a melting point of 148° C. and an MFR of 7.0 g/10 min and contained no clarifying nucleating agent and the colored polypropylene resin composition of layer B contained a propylene-ethylene random copolymer having a melting point of 138° C. and an MFR of 0.4 g/10 min and the same coloring pigment as in Example 7 in the same concentration.

Comparative Example 5

A molding was obtained in the same manner as in Example 7 except that the transparent polypropylene resin composition of layer A contained a propylene homopolymer having a melting point of 165° C. and an MFR of 7.0 g/10 min and 0.2 wt % of the clarifying nucleating agent.

Comparative Example 6

A molding was obtained in the same manner as in Example 7 except that the colored polypropylene resin composition of layer B was a propylene homopolymer colored the same color using the same coloring pigment as in Example 7 and having a melting point of 165° C. and an MFR of 7.0 g/10 min.

The physical properties and layer thicknesses of resins constituting the resin compositions of the respective layers of Examples 1 to 10 and Comparative Examples 1 to 6 are shown in Table 1. The compositions of the resin compositions are shown in Table 2. The evaluation results of the physical properties of the obtained moldings are shown in Table 3. It is shown that the polypropylene resin exterior panel composed of a laminate of layers made from specific resin compositions according to the present invention has excellent appearance qualities and high strength.

TABLE 1

| | Melting point (° C)/ethylene content (%) of resin | | | | MFR of resin (g/10 min) | | | | Thickness of layer (mm) | | | |
|---|---|---|---|---|---|---|---|---|---|---|---|---|
| | Surface layer (Layer A) | Intermediate layer (Layer B) | Under layer (Layer C) | Base layer (Layer D) | Layer A | Layer B | Layer C | Layer D | Layer A | Layer B | Layer C | Layer D |
| Example 1 | 148/2.5 | 138/4.0 | — | 165/6.0 | 2.0 | 2.0 | — | 30 | 0.1 | 0.3 | — | 2.5 |
| Example 2 | 148/2.5 | 138/4.0 | — | 165/6.0 | 7.0 | 2.0 | — | 10 | 0.1 | 0.3 | — | 2.5 |
| Example 3 | 148/2.5 | 138/4.0 | 165/6.0 | 165/6.0 | 7.0 | 5.0 | 2.0 | 30 | 0.1 | 0.3 | 0.4 | 2.5 |
| Example 4 | 138/2.0 | 138/4.0 | — | 165/6.0 | 6.0 | 2.0 | — | 30 | 0.1 | 0.3 | — | 2.5 |
| Example 5 | 148/2.5 | 125/6.5 | — | 165/6.0 | 2.0 | 5.0 | — | 30 | 0.1 | 0.3 | — | 2.5 |
| Example 6 | 148/2.5 | 138/4.0 | 165/6.0 | 165/6.0 | 7.0 | 5.0 | 2.0 | 10 | 0.1 | 0.3 | 0.4 | 2.5 |
| Example 7 | 148/2.5 | 138/4.0 | 165/6.0 | 165/6.0 | 7.0 | 5.0 | 2.0 | 30 | 0.1 | 0.3 | 0.4 | 4.0 |
| Example 8 | 148/2.5 | 138/4.0 | 165/6.0 | 165/6.0 | 7.0 | 5.0 | 2.0 | 30 | 0.1 | 0.3 | 0.4 | 4.0 |
| Example 9 | 148/2.5 | 138/4.0 | 165/6.0 | 165/6.0 | 7.0 | 5.0 | 2.0 | 30 | 0.1 | 0.3 | 0.4 | 4.0 |
| Example 10 | 148/2.5 | 138/4.0 | 165/6.0 | 165/6.0 | 7.0 | 5.0 | 2.0 | 30 | 0.1 | 0.3 | 0.4 | 4.0 |
| Comparative Example 1 | 148/2.5 | 138/4.0 | — | 165/6.0 | 7.0 | 2.0 | — | 30 | 0.1 | 0.3 | — | 2.5 |
| Comparative Example 2 | 148/2.5 | 165/0 | — | 165/6.0 | 7.0 | 2.0 | — | 30 | 0.1 | 0.3 | — | 2.5 |
| Comparative Example 3 | 148/2.5 | 165/6.0 | — | 165/6.0 | 7.0 | 2.0 | — | 30 | 0.1 | 0.3 | — | 2.5 |
| Comparative Example 4 | 148/2.5 | 138/4.0 | 165/6.0 | 165/6.0 | 7.0 | 0.4 | 2.0 | 30 | 0.1 | 0.3 | 0.4 | 4.0 |
| Comparative Example 5 | 165/0 | 138/4.0 | 165/6.0 | 165/6.0 | 7.0 | 5.0 | 2.0 | 30 | 0.1 | 0.3 | 0.4 | 4.0 |
| Comparative Example 6 | 148/2.5 | 165/0 | 165/6.0 | 165/6.0 | 7.0 | 7.0 | 2.0 | 30 | 0.1 | 0.3 | 0.4 | 4.0 |

TABLE 2

| | Clarifying nucleating agent in layer A (wt %) | Coloring pigment in layer B (parts by weight) | Filler content in layer D (parts by weight) | | | Elastomer content in layer D (parts by weight) | |
|---|---|---|---|---|---|---|---|
| | | | Talc | MOS | LGF | Ethylene-based | Styrene-based |
| Example 1 | 0.2 | 1.5 | 0 | 0 | 0 | 0 | 0 |
| Example 2 | 0.2 | 1.0 | 0 | 0 | 0 | 0 | 0 |
| Example 3 | 0.2 | 10 | 0 | 0 | 0 | 0 | 0 |
| Example 4 | 0.2 | 1.5 | 0 | 0 | 0 | 0 | 0 |
| Example 5 | 0.2 | 10 | 0 | 0 | 0 | 0 | 0 |
| Example 6 | 0.2 | 10 | 0 | 0 | 0 | 0 | 0 |
| Example 7 | 0.2 | 10 | 30 | 0 | 0 | 30 | 0 |
| Example 8 | 0.2 | 10 | 0 | 0 | 20 | 0 | 0 |
| Example 9 | 0.2 | 10 | 0 | 30 | 0 | 30 | 0 |
| Example 10 | 0.2 | 10 | 30 | 0 | 0 | 0 | 30 |
| Comparative Example 1 | 0 | 1.5 | 0 | 0 | 0 | 0 | 0 |
| Comparative Example 2 | 0.2 | 1.5 | 0 | 0 | 0 | 0 | 0 |
| Comparative Example 3 | 0.2 | 1.5 | 0 | 0 | 0 | 0 | 0 |
| Comparative Example 4 | 0 | 10 | 30 | 0 | 0 | 30 | 0 |
| Comparative Example 5 | 0.2 | 10 | 30 | 0 | 0 | 30 | 0 |
| Comparative Example 6 | 0.2 | 10 | 30 | 0 | 0 | 30 | 0 |

MOS: magnesium sulfate whisker
LGF: long glass fiber (fiber length of 6 mm)

TABLE 3

| | Turbidity | Color depth | Pigment dispersibility | Falling ball impact strength |
|---|---|---|---|---|
| Example 1 | ○ | ○ | ○ | ○ |
| Example 2 | ○ | ○ | ○ | ○ |
| Example 3 | ○ | ○ | ○ | ○ |
| Example 4 | ○ | ○ | ○ | ○ |
| Example 5 | ○ | ○ | ○ | ○ |
| Example 6 | ○ | ○ | ○ | ○ |
| Example 7 | ○ | ○ | ○ | ○ |
| Example 8 | ○ | ○ | ○ | ○ |
| Example 9 | ○ | ○ | ○ | ○ |
| Example 10 | ○ | ○ | ○ | ○ |
| Comparative Example 1 | x | ○ | ○ | ○ |
| Comparative Example 2 | ○ | ○ | ○ | x |
| Comparative Example 3 | ○ | x | ○ | ○ |
| Comparative Example 4 | x | ○ | x | ○ |
| Comparative Example 5 | ○ | ○ | ○ | x |
| Comparative Example 6 | ○ | x | ○ | x |

What is claimed is:

1. An exterior panel which comprises a laminate comprising a surface layer, an intermediate layer and a base layer,
   said surface layer comprises a transparent polypropylene resin composition comprising a propylene-α-olefin random copolymer having a melting point of lower than 155° C. and a melt flow rate of 0.5 to 30 g/10 minutes and a clarifying nucleating agent;
   said intermediate layer comprises a colored polypropylene resin composition comprising a propylene-α-olefin random copolymer having a melting point of lower than 155° C. and a melt flow rate of 0.5 to 3.0 g/10 minutes and a coloring pigment; and
   said base layer comprises a polypropylene resin composition comprising a propylene-α-olefin block copolymer having a melting point of 155° C. or higher and a melt flow rate of 2 to 100 g/10 minutes.

2. An exterior panel according to claim 1, wherein said laminate further comprises an under layer between said intermediate layer and said base layer; said under layer comprises a propylene-α-olefin block copolymer having a melting point of 120° C. or higher and a melt flow rate of 0.5 to 30 g/10 minutes.

3. An exterior panel according to claim 1, wherein said base layer comprises a polypropylene resin composition comprising a propylene-α-olefin block copolymer having a melting point of 155° C. or higher and a melt flow rate of 2 to 100 g/10 minutes, an elastomer and an inorganic filler.

4. An exterior panel according to claim 1, wherein said intermediate layer has a thickness of 1 mm or less and a relationship between the thickness "d" in mm and a concentration "a" in wt % of the coloring pigment in the colored polypropylene composition satisfies the expression (I):

$$0.1 \leq d \times a \leq 6 \tag{I}$$

5. An exterior panel according to claim 1, wherein said laminate further comprises a hard coat layer; said hard coat layer comprises an acrylic resin or a urethane resin on an exterior side of the surface layer.

6. A method for producing the exterior panel as defined in claim 1 by using an injection mold comprising the steps of:
   forming the surface layer and the intermediate layer to form a skin by laminating the surface layer and the intermediate layer;
   disposing the skin in the injection mold in such a manner that the surface layer of the skin is in contact with the injection mold; and
   forming the base layer which is integrated with the skin by injecting and filling a molten polypropylene resin composition into the injection mold so that the base layer is laminated on the intermediate layer of the skin.

7. A method for producing the exterior panel according to claim 6, wherein said skin forming step comprises;
   forming the surface layer, the intermediate layer and an under layer between the intermediate layer and base layer, to form the skin by laminating the surface layer, the intermediate layer and the under layer together, said under layer comprises a polypropylene resin composition comprising a propylene-α-olefin block copolymer having a melting point of 120° C. or higher and a melt flow rate of 0.5 to 30 g/10 minutes.

8. A method for producing the exterior panel according to claim 6, wherein said skin forming step comprises:

forming the surface layer, the intermediate layer and a hard coat layer on the exterior side of the surface layer, to form the skin by laminating the hard coat layer, the surface layer and the intermediate layer together, said hard coating layer comprising an acrylic resin or an urethane resin.

* * * * *